(12) United States Patent
Haulick et al.

(10) Patent No.: US 8,724,822 B2
(45) Date of Patent: *May 13, 2014

(54) NOISY ENVIRONMENT COMMUNICATION ENHANCEMENT SYSTEM

(75) Inventors: Tim Haulick, Blaubeuren (DE); Gerhard Uwe Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1633 days.

This patent is subject to a terminal disclaimer.

(21) Appl. No.: 11/924,987

(22) Filed: Oct. 26, 2007

(65) Prior Publication Data

US 2008/0107280 A1 May 8, 2008

Related U.S. Application Data

(63) Continuation-in-part of application No. 10/556,232, filed as application No. PCT/EP2004/004980 on May 10, 2004, now Pat. No. 7,643,641.

(30) Foreign Application Priority Data

May 9, 2003 (EP) .................................. 03010490
May 15, 2003 (EP) .................................. 03010913

(51) Int. Cl.
   *H04B 3/20* (2006.01)
(52) U.S. Cl.
   USPC ........................................... 381/66; 381/365

(58) Field of Classification Search
   USPC ................................................. 381/66, 365
   See application file for complete search history.

(56) References Cited

U.S. PATENT DOCUMENTS

| 6,449,593 | B1 * | 9/2002 | Valve ............................. 704/233 |
| 7,206,418 | B2 * | 4/2007 | Yang et al. ...................... 381/92 |
| 7,643,641 | B2 * | 1/2010 | Haulick et al. .................. 381/92 |
| 2001/0038698 | A1 * | 11/2001 | Breed et al. ..................... 381/86 |
| 2003/0072461 | A1 | 4/2003 | Moorer |

FOREIGN PATENT DOCUMENTS

| DE | 101 56 954 A1 | 6/2003 |
| EP | 1 083 543 A2 | 3/2001 |
| EP | 1 116 961 A2 | 7/2001 |
| EP | 1 343 351 A1 | 9/2003 |
| GB | 2 097 121 A | 10/1982 |
| JP | 07 176178 A | 7/1995 |

* cited by examiner

*Primary Examiner* — Phat X Cao
(74) *Attorney, Agent, or Firm* — Daly, Crowley, Mofford & Durkee, LLP

(57) ABSTRACT

A communication system enhances communications in a noisy environment. Multiple input arrays convert a voiced or unvoiced signal into an analog signal. A converter receives the analog signal and generates digital signals. A digital signal processor determines temporal and spatial information from the digital signals. The processed signals are then converted to audible sound.

18 Claims, 6 Drawing Sheets

NOISY ENVIRONMENT COMMUNICATION ENHANCEMENT SYSTEM

PRIORITY CLAIM

This application is a continuation-in-part of U.S. patent application Ser. No. 10/556,232 filed on Oct. 12, 2006, which claims the benefit of priority from PCT Application No. PCT/EP2004/004980 filed on May 10, 2004, which claims the benefit of priority from European Patent Application No. 03010490.5, filed on May 9, 2003, and European Patent Application No. 03010913.6, filed May 15, 2003. The entire content of the applications are incorporated by reference except that in the event of inconsistent disclosure, the disclosure herein shall be deemed to prevail.

BACKGROUND OF THE INVENTION

1. Technical Field

This invention relates to a communication enhancement, and more particularly, to improving communication in a vehicle.

2. Related Art

In a noisy environment, communication between persons may be difficult. Within a vehicle, noise may be created by the engine, the road, the tires, or by the movement of air. Loudspeakers or a hands free system may also create noise. These noise sources may make it difficult to communicate if the noise level reaches the loudness level of speech. Therefore, there is a need for a system that enhances sound in a noisy environment.

SUMMARY

A system enhances communications in a noisy environment. Multiple input arrays convert a voiced or unvoiced sound into an analog signal. A converter generates digital signals in response to the analog signals. A processor processes the signals and determines temporal and spatial information. The processed signals are converted into aural signals.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
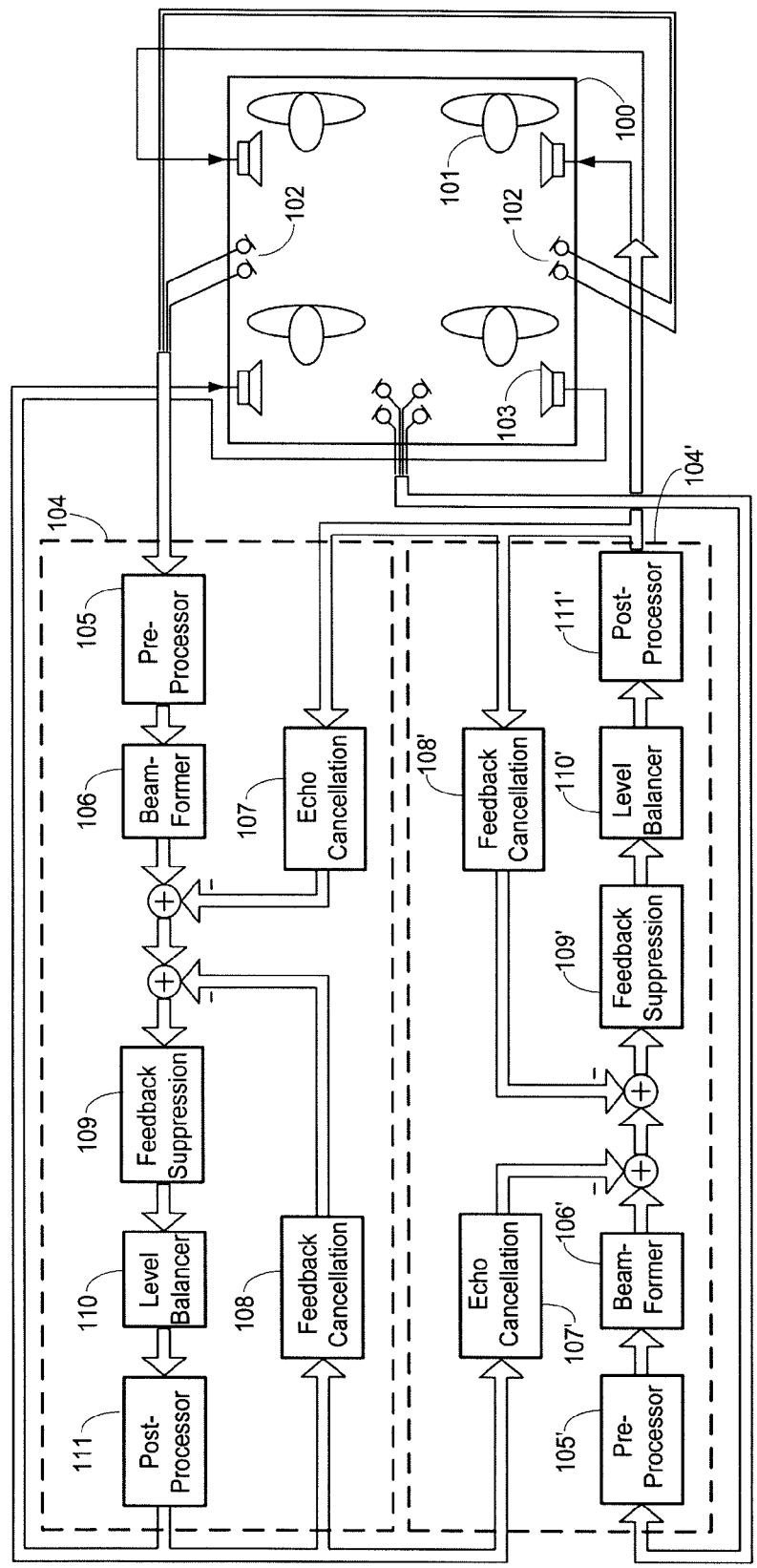
FIG. 1 is a diagram of an enhancement system.

FIG. 1 is a diagram of an enhancement system. In FIG. 1, the enhancement system is incorporated in a device or structure that transports persons or things, such as a vehicle 100. The vehicle 100 may comprise passenger seats (not shown) and passengers 101. An input array and output device may be associated with each passenger. The input array may comprise devices that convert sound into an operational signal, such as two or more microphones 102. The output device may comprise devices that convert signals to audible sound, such as loudspeaker 103. The input arrays for the front passengers may be arranged between the front passengers. In some systems, the input arrays may be positioned at an interior portion of the roof. In other systems, the front input arrays may be arranged on or in a mirror and/or a dashboard. Rear input arrays may be provided at the left and right side of the passengers, respectively. In some systems, the rear input arrays may be positioned in the car doors, in the headliner, and/or the front passenger seats.

The input arrays receive acoustic signals. The received acoustic signals may be input to the digital signal processing stages 104 and 104'. A first digital signal processing stage 104 may process the signals from the input arrays associated with the rear passengers, and a second digital signal processing stage 104' may process the signals from the input arrays associated with the front passengers. In other systems, different combinations of stages may be used to process the signals associated with the passengers. In some systems the digital signal processing stages 104 and 104' may be combined into one stage.

Pre-processors 105 and 105' may translate input into digital signals. The pre-processors 105 and 105' may comprise an analog-to-digital converters ("ADC") that convert the received signals into digital signals.

The ADC may also be separate from the digital signal processor. In some systems, the digital signal processing stages 104 and 104' may have inputs that receive the digital input signals and outputs that transmit processed output signals to an external device, such as loudspeaker 103.

The pre-processors 105 and 105' may communicate with beamformers 106 and 106', respectively. A beamformer may exploit the lag time from direct and reflected signals arriving at different elements of the input arrays that are positioned apart. Some beamformers may use delay-and-sum logic, which may include delay compensation and summing of the signals. Depending on the beamformer configuration, beamforming may allow for a specific directivity pattern for an input array, such as a microphone array.

The beamformers 106 and 106' may obtain temporal signal behavior and spatial information from signal sources and noise signal sources. Desired signals may comprise a passenger's voiced and unvoiced speech. Noise signal sources may comprise radio, engine noise, and/or wind noise signals.

The system may compensate for feedback by subtracting echo and/or feedback components from the signals through cancellation filters. Cancellation filters may comprise adaptive echo cancellation filters 107 and 107' and/or feedback cancellation filters 108 and 108.' Saturation detection may be used to control cancellation filters.

The system may reduce other feedback effects by detecting build-up (e.g., resonance rise). In some systems, potential feedback frequencies may be detected, and, corresponding notch filters may be placed tuned to these frequencies. In other systems, feedback suppression stages 109 and 109,' which may comprise adaptive notch filters or narrow band notch filters, may detect potential feedback frequencies and attenuate the feedback.

Attenuators may respond to the temporal and the spatial information from the beamformers 106 and 106.' In some systems, only the loudest speech signals may pass through to the corresponding speakers. Other signals may be attenuated by level balancers 110 and 110.'

In other systems, a double or multi-talk may occur when multiple speech signals pass through to the corresponding speakers. In these systems, the signals of the input arrays associated with non-active passengers may be attenuated. The level balancers 110 and 110' may determine amplification of an output signal based on a background noise.

The level balancers 110 and 110' may communicate with post-processors 111 and 111', respectively. The post-processors may apply a boundary characteristic. The processed output signals of the digital signal processing stages 104 and 104' may be fed to loudspeakers 103. Signals from the rear input arrays may drive the front loudspeakers, and signals from the front input arrays may drive the rear loudspeakers. The processed output signals may drive any of the loudspeakers in different combinations. However, the signals generated by an input array should not drive a loudspeaker located near or substantially close to an input array.

In some systems, the processed output signals may be processed by the feedback cancellation filters 108 and 108' of the same digital signal processing stage and the echo cancellation filters 107 and 107' of a different digital signal processing stage. Other combinations connecting the feedback and echo cancellation filters with the digital signal processing stages may also be used.

Figure 2:
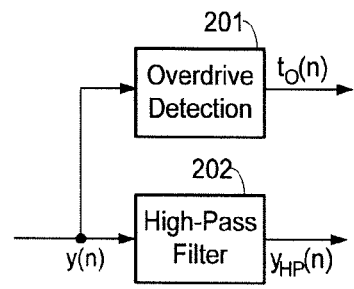
FIG. 2 is a diagram of a pre-processor of the enhancement system.

FIG. 2 is a pre-processor diagram, such as the pre-processor 105 and/or 105.' In FIG. 2, an overdrive detector 201 may process the incoming signals y(n). The overdrive detector 201 may compare an absolute value of each signal y(n) with a predetermined threshold. If the absolute value of the signal y(n) exceeds the threshold, a detection variable $t_o(n)$ may be set. The detection variable may be delayed for a predetermined time interval. During the time interval, the processing time of system adaptive logic may be reduced. Reduced processing time may reduce echoes and feedback caused by an overdrive.

Each microphone signal y(n) may be passed through a high pass filter 202 generating a high pass filtered signal $y_{HP}(n)$. Signal components, such as background noise, below a cutoff frequency, may be substantially removed or dampened. The cutoff frequency may be near a lowest speech frequency perceived by the ear (e.g., about 100 Hz to about 200 Hz). A minimal propagation delay caused by the high pass filter may be minimized. The delay through the entire digital signal processing stage may be less than about 10 ms.

Figure 3:
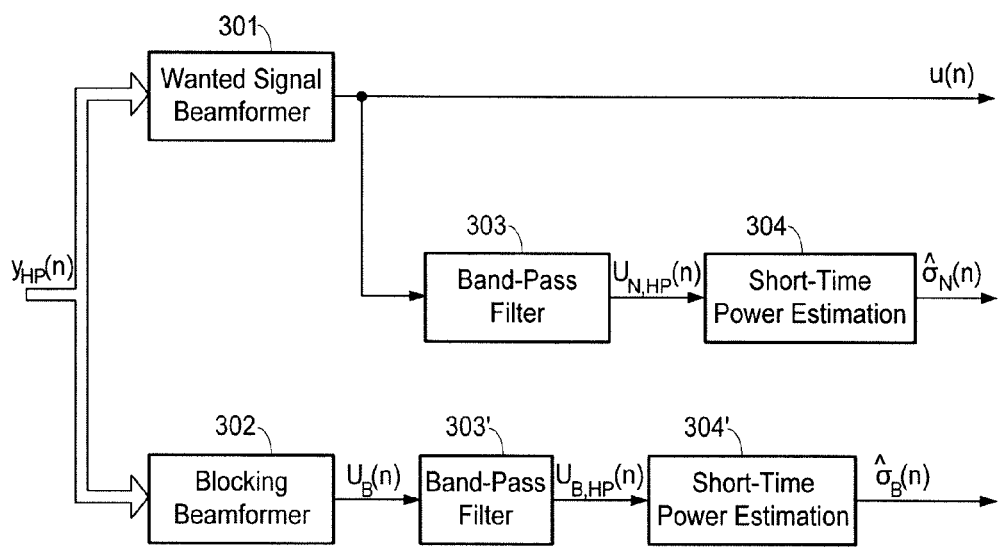
FIG. 3 is a diagram of a beamformer of the enhancement system.

The high pass filtered signals $y_{HP}(n)$ may be sent to the beamformers 106 or 106' (FIGS. 1 and 3). The beamformer may comprise a wanted signal beamformer 301 and a blocking beamformer 302. The signals $y_{HP}(n)$ may be processed by the wanted signal beamformer 301 and the blocking beamformer 302 to obtain a wanted signal and a blocking signal.

The wanted signal beamformer 301 may combine the input signals with digital filters such that signals stemming from a preferred direction (e.g., from a passenger to the corresponding input array) may be transmitted without attenuation, and the signal components of other directions may be substantially attenuated. The blocking beamformer 302 may substantially suppress signals from the wanted signal direction and transmit signal components from all other directions of incidence with minimum distortion.

The output signals of the wanted signal beamformer, u(n), and of the blocking beamformer, $u_B(n)$, may be processed. In some systems, information regarding speech activity and directional information may be obtained from these signals. Speech activity may be detected from the temporal and spatial information gathered by the beamformers.

Both the output signals of the wanted and blocking beamformer may be passed through band-pass filters 303 and 303,' yielding output signals $u_{N,HP}(n)$ and $u_{B,HP}(n)$, respectively. Low frequency signal components may be substantially removed by the band-pass filters 303 and 303.' In some low frequency ranges, the wanted signal beamformer may have almost no directivity and almost no signals may pass the blocking beamformer. In the high frequency range, both beamformers may have a poor directivity. The band-pass filtered signals may be used to determine short time powers $\hat{\sigma}_N(n)$ and $\hat{\sigma}_B(n)$ through power estimation stages 304 and 304', respectively. For example, according to a first order recursive filtering:

$$\hat{\sigma}_N(n)=\beta\hat{\sigma}_N(n-1)+(1-\beta)|u_{N,HP}(n)|, \quad (1)$$

$$\hat{\sigma}_B(n)=\beta\hat{\sigma}_B(n-1)+(1-\beta)|u_{B,HP}(n)|. \quad (2)$$

The quantities $u_{N,HP}(n)$ and $u_{B,HP}(n)$ may designate the high pass filtered signals processed by the wanted signal beamformer and the blocking beamformer output, respectively. The constants $\beta$ may be within the range of about 0.9 to about 0.999. By comparing both short time powers, different speech scenarios may be determined. Some speech scenarios may include:

- if a passenger is not speaking, a diffuse noise field may be present in the vehicle, and both short time powers may have approximately the same value (after removal of distortions).
- if a passenger is speaking in a wanted signal direction, the short time power of the wanted signal beamformer may be larger than the short time power of the blocking beamformer output.
- if one of the other passengers is speaking, who is not located in a wanted signal direction, the short time power of the blocking beamformer may be larger than the short time power of the wanted signal beamformer.

The beamformers and/or the band-pass filters may have different configurations to enhance signal processing. A minimal delay time may be configured or programmed into the system to reduce echo and/or feedback. The directivity of the wanted signal beamformer may be enhanced by using an adaptive beamformer. An adaptive beamformer may react to variations in the input signals, such as changes in the noise sources (switching on a car radio, opening a window, enhanced motor noise, etc.), and determine relevant parameter values of the beamformer, such as filter coefficients, either continuously or periodically during operation. With such an adaptive wanted signal beamformer, spatial zeros may be directed to specific noise sources. In this way, it may be possible to specifically suppress unwanted signals without a complicated multi-channel echo cancellation or other advanced signal processing techniques.

Figure 4:
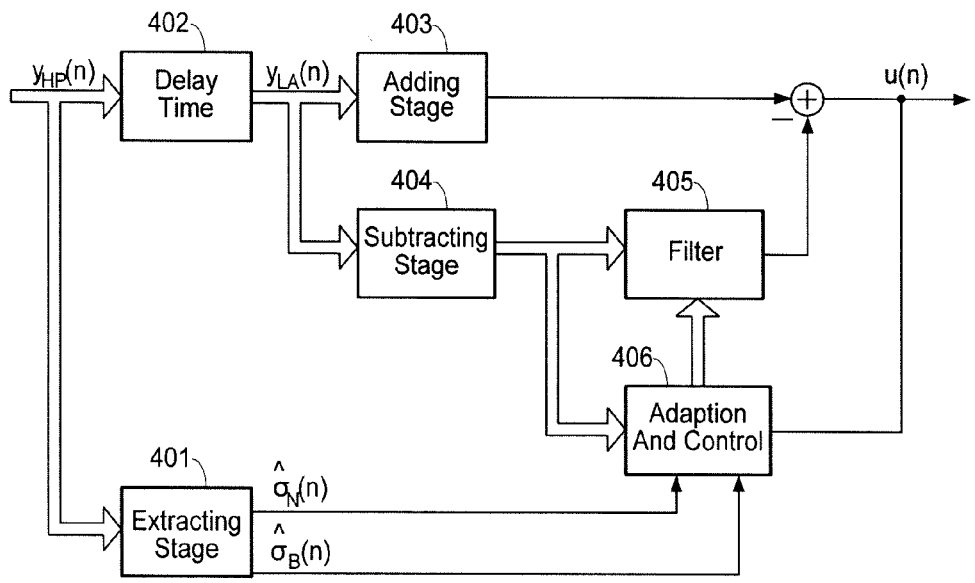
FIG. 4 is a diagram of a generalized sidelobe canceller of the enhancement system.

FIG. 4 is a diagram of a generalized sidelobe canceller ("GSC"), such as a Griffith-Jim structure. The extraction of the spatial information $\hat{\sigma}_N(n)$ and $\hat{\sigma}_B(n)$ may be determined by extraction stage 401. The output signal of the wanted signal beamformer, u(n), may be determined using the adaptive structure.

A delay time compensation may be performed by delay time compensation stage 402 yielding an output signal $y_{LA}(n)$. In a first path, the $y_{LA}(n)$ signals corresponding to the different receivers or microphones of an input array may be summed in an adding stage 403. In a second, adaptive path, the $y_{LA}(n)$ signals received through different receivers or microphones of the input array may be subtracted from each other by a subtracting stage 404. The resulting signals may be passed through an adaptive filter 405, which may be controlled by an adaptation and control stage 406.

An adaptation may be performed if no signal from the wanted signal direction is transmitted or if the blocking signal power is larger than a predetermined threshold, such as a constant times the wanted signal power. The adaptation and control stage 406 may check this condition by applying the logic:

$$\hat{\sigma}_B(n) > K_{BF} \hat{\sigma}_N(n) \tag{3}$$

The constant $K_{BF}$ may vary by application. The predetermined constant, $K_{BF}$, may be chosen such that the criterion may be robust even if the signal powers are fluctuating. Using this logic, it is possible to determine which signals dominate. A dominating signal condition from a blocking beamformer may occur when an input array substantially receives car radio signals but no speech signals of a corresponding passenger.

In some systems, if none of the passengers are speaking, the car radio may drive loudspeakers. The controlled adaptation of the mounted signal beamformer may direct the spatial zeros of the beamformer to the position of the loudspeakers. In this way, a highly advantageous signal suppression (e.g., of the car radio signals) may occur without complicated multi-channel echo cancellation. In particular, if no signal is transmitted from the wanted signal direction, no interference between such a signal and noise signals may be present, thus, simplifying the adaptation of the beamformer. If the same loudspeakers are delivering the car audio signals and the speech signals, an adaptation during speech pauses may increase the stability of the communication system and reduce the liveness of the signals to be reproduced.

The enhancement system may include an adaptive attenuation control. The adaptive attenuation control may be used whether one or several of the passengers are speaking. The signal of the respective active passenger or passengers may drive loudspeakers located in the vicinity of the other passengers.

Because the position of the seats and, therefore, also the distance between the speakers and the microphones of a corresponding input array may not be known, an automatic gain control may be determined for each beamformer output. The automatic gain control may compensate for a varying loudness due to varying distances, level differences due to loudness level, or for other characteristics and conditions.

Figure 5:
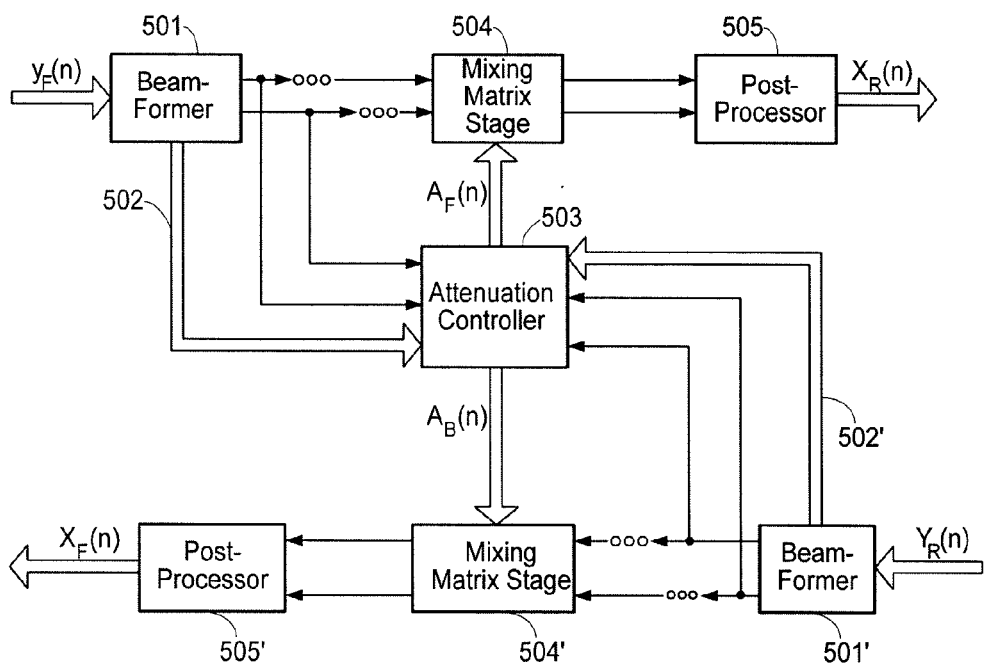
FIG. 5 is a diagram of an attenuation control of the enhancement system.

FIG. 5 is an attenuation control. Signals from front receiver $y_F(n)$ and rear receiver $y_R(n)$ may be received by beamformers 501 and 501.' Short time powers 502 and 502' may be sent from the beamformers to an attenuation controller 503. The attenuation controller 503 may generate mixing matrices that are transmitted by mixing matrix stages 504 and 504.' After post-processing through post-processors 505 and 505', output signals for the rear loudspeakers, $x_R(n)$, and for the front loudspeakers, $x_F(n)$, may be obtained.

For example, using two mixing matrices, $A_F(n)$ and $A_R(n)$, the output signals of the front and the rear beamformers may be combined for post-processing. By designating the output signals of the front beamformer by $u_{F,left}(n)$ and $u_{F,right}(n)$ and the output signals of the rear beamformer by $u_{R,left}(n)$ and $u_{R,right}(n)$, the mixing may be described by:

$$\underbrace{\begin{bmatrix} d_{R,left}(n) \\ d_{R,right}(n) \end{bmatrix}}_{d_R(n)} = \underbrace{\begin{bmatrix} a_{F,11}(n) & a_{F,12}(n) \\ a_{F,21}(n) & a_{F,22}(n) \end{bmatrix}}_{A_F(n)} \underbrace{\begin{bmatrix} u_{F,left}(n) \\ u_{F,right}(n) \end{bmatrix}}_{u_F(n)} \tag{4}$$

$$\underbrace{\begin{bmatrix} d_{F,left}(n) \\ d_{F,right}(n) \end{bmatrix}}_{d_F(n)} = \underbrace{\begin{bmatrix} a_{R,11}(n) & a_{R,12}(n) \\ a_{R,21}(n) & a_{R,22}(n) \end{bmatrix}}_{A_R(n)} \underbrace{\begin{bmatrix} u_{R,left}(n) \\ u_{R,right}(n) \end{bmatrix}}_{u_R(n)} \tag{5}$$

Determination of mixing coefficients for attenuation control may be accomplished in a variety of ways. In some systems, the mixing coefficients may be based on a calculated automatic gain control. During speech activity, a speech level may be determined and compared to a reference value. If the speech level, which may be increased or decreased by a corresponding correction factor, is smaller than the reference value, a small increase of the correction value may be performed. If the speech level is larger than the reference value, the correction value may be decreased.

In other systems, the mixing coefficients may be based on the determination of an active speaker. The beamformer output signal of the active speaker may be converted to sound by loudspeakers situated in the vicinity of the other passengers. In other systems, the mixing coefficients may be based on an output volume determined for each seat, which may depend on the noise level. This value may not depend on the respective speech activity but on the background noise level specific for each seat. In yet other systems, the mixing coefficients may be based on a programmed automatic gain control, a determination of an active speaker, and/or an output volume of each seat.

Figure 6:
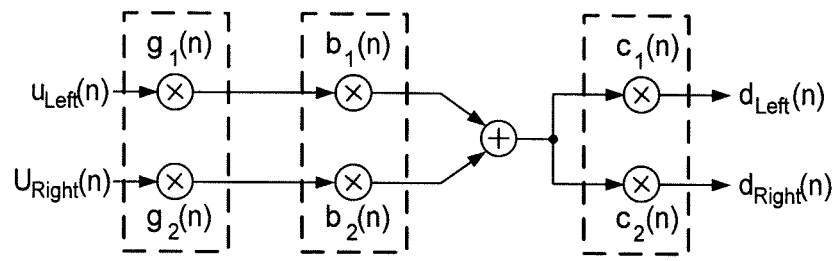
FIG. 6 is a block diagram of a determination of mixing coefficients for attenuation.

FIG. 6 is a block diagram of a determination of mixing coefficients for attenuation. For clarity, the index identifying the front or rear row is not described. First, the coefficients of the automatic gain control, $g_i(n)$, may be determined. Then the coefficients of the speech controlled attenuation, $b_i(n)$, and the coefficients of the noise dependent volume adaptation, $c_i(n)$, may be determined. This may yield the following mixing coefficients:

$$a_{11}(n) = g_1(n)b_1(n)c_1(n) \tag{6}$$

$$a_{12}(n) = g_2(n)b_2(n)c_1(n) \tag{7}$$

$$a_{21}(n) = g_1(n)b_1(n)c_2(n) \tag{8}$$

$$a_{22}(n) = g_2(n)b_2(n)c_2(n) \tag{9}$$

With regards to the automatic gain control, a mean speech $\hat{\sigma}_{N,Act}(n)$ may be estimated during speech activity. This may be derived by a multiplicative correction of the form:

$$\hat{\sigma}_{N,Act}(n) = \begin{cases} \hat{\sigma}_{N,Act}(n-1)K(n), & \text{for speech activity} \\ \hat{\sigma}_{N,Act}(n-1), & \text{else.} \end{cases} \tag{10}$$

The correction factor may be determined according to:

$$K(n) = \begin{cases} K_r, & \text{if } \hat{\sigma}_{N,Act}(n-1) < \hat{\sigma}_{N,Act}(n) \\ K_f, & \text{else.} \end{cases} \quad (11)$$

For example, $K_r > 1$ and $K_f < 1$. To determine the speech activity for each seat, the background noise estimation $\hat{\sigma}_H(n)$ may be performed. In this application, the short time power of the wanted signal beamformer $\hat{\sigma}_N(n)$ may be determined according to Equation (1). The background noise signal power $\hat{\sigma}_H(n)$ may be determined using the power of the wanted signal beamformer $\hat{\sigma}_N(n)$ according to:

$$\hat{\sigma}_H(n) = \{\hat{\sigma}_H(n-1), \hat{\sigma}_N(n)\}(1+\epsilon). \quad (12)$$

The constant $\epsilon$ may be a small predetermined number between about 0 and about 1.

If no speech signal is present, the background noise signal power may be determined as the wanted signal power times $(1+\epsilon)$. If the input array receives speech, the wanted signal power may be larger than the background noise signal power at a preceding time step. Therefore, the background noise signal power at a present time step may be determined as the background noise signal power at the preceding time step times $(1+\epsilon)$.

To detect speech activity, the following conditions may be fulfilled:

$$\hat{\sigma}_N(n) < K_1 \hat{\sigma}_H(n), \quad (13)$$

$$\hat{\sigma}_N(n) < K_2 \hat{\sigma}_B(n), \quad (14)$$

Condition (13) may be used to check temporal information and condition (14) may be used to check spatial information regarding speech detection. The use of input arrays that include at least two receivers or microphones may obtain the signals for the spatial condition (14). With high background noise levels, the spatial criteria may seem to be more robust than the temporal criteria.

To determine the attenuation coefficients, $b_i(n)$, a nominal status may be estimated. This may occur by detecting whether one or several passengers are speaking. If conditions (13) and (14) are fulfilled, a loudest speaker (e.g., a most active speaker) may be determined by comparing the beamformer output powers and determining a highest power. In some systems, the nominal attenuation may be set to about 0 dB for the seat with the loudest speaker, and other seats may have a nominal attenuation value larger than about 0 dB. If no passenger is speaking, the same procedure may be performed with the exception that the attenuation value of the previously active speaker may be set to a lower attenuation value. Also, if no speech activity is detected over a predetermined time interval, the attenuation of the previous active passenger may be set to the value corresponding to the other passengers. For example, if only one passenger is speaking (e.g., only one input array is detecting speech activity), the corresponding signals may be transmitted without attenuation and the signals of the other input arrays may be attenuated with a predetermined maximum attenuation factor. As soon as the passenger stops speaking, the signals of the corresponding input array may be attenuated by a small attenuation factor, in which the receiver or microphone array may be waiting for the passenger to begin speaking again. If the passenger remains silent, the attenuation factor for the corresponding input array may be increased in predetermined time steps over a time interval up to a predetermined maximum attenuation.

The nominal values of the attenuation may be used to determine the attenuation coefficients, $b_i(n)$, through a first order recursive smoothing with suitable time constants. If two or more passengers are speaking at the same time, the detection of the respective most active passenger, depending on the volume of each speaker, may change several times. Because of the recursive smoothing, only a small attenuation may be added for the active passengers. Therefore, several directions may be enhanced at the same or substantially the same time.

For each seat, an individual output volume may be determined. This volume may depend on the respective background noise levels and may vary with different driving scenarios (e.g., in the city or on the highway). The volume control or amplification may be determined for each seat or output loudspeaker separately. If one of the passengers opens a window, the corresponding output volume for an associated seat may be increased with respect to the other seats.

After having weighted and summed the beamformer output signals of the different seats in pairs, coefficients of the noise dependent volume adaptation, $c_i(n)$, may be determined for each seat. For example, if the vehicle is not moving and the engine is switched off, these coefficients may be normalized to about 0 dB. With increasing driving speed, wind, and engine noise, these coefficients may be increased. To take these changes into account, the signals of the system may be amplified. In some systems, the estimated background noise levels $\hat{\sigma}_{H,i}(n)$ may be compared with one, two, or more thresholds. As the background noise level passes one of the thresholds, an increase in the output volume may occur. This may be done for a particular range, such as about of 0 dB to about 10 dB. As the background noise estimations are determined based on the beamformer output powers, a spatial separation of the different seats may be detected and an individual output volume may be determined for each seat. This may be desired if, for example, one of the windows of the vehicle is open. In this case, the volume of the loudspeakers in the vicinity of the seat by the open window may be increased. Before converting the processed output signal to sound, limiter characteristics may also be applied to the signal. Short but loud passages may be dampened without reducing the volume of the overall signal.

The enhancement system may also include the logic to select one or more output channel from two output channels. The output channels may correspond to the loudspeakers that converts the signal received on a particular channel.

For example, each seat may have an associated input array and loudspeaker, in which the loudspeaker may be an audio loudspeaker. In such a case, speech signals may not be transmitted by a loudspeaker associated with that passenger.

Selecting one or more output channels may include determining an amplification for each selected output channel. The ambient noise may be taken into account for each selected output channel separately. If, for example, a passenger opens the window, the output channel leading to the corresponding loudspeaker may be provided with a corresponding amplification.

Figure 7:
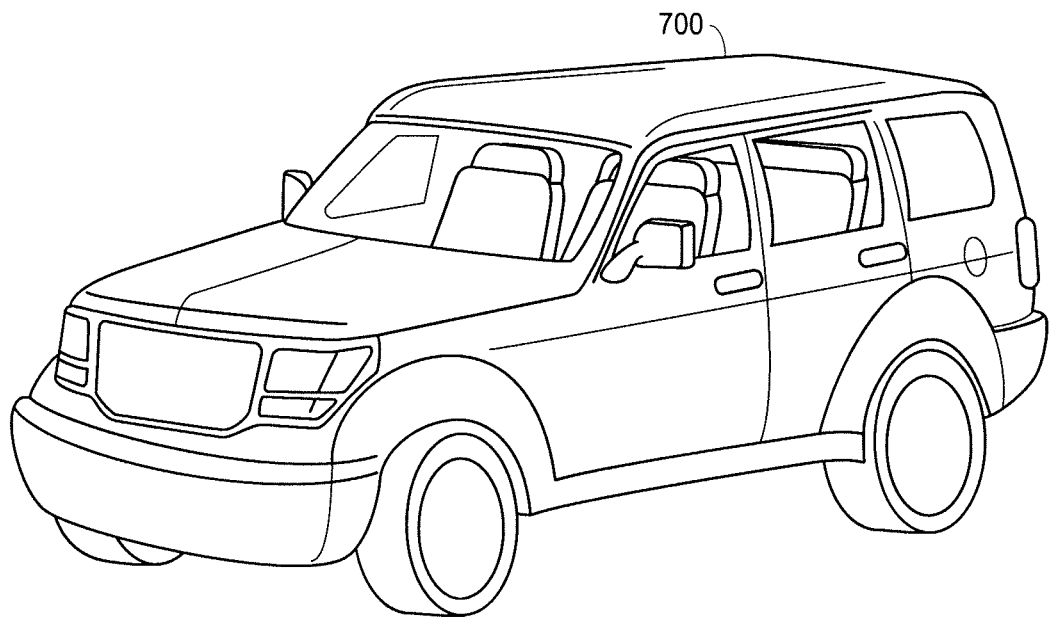
FIG. 7 is an enhancement system integrated within a vehicle.

The enhancement system may be linked or coupled to a vehicle, such as the automobile shown in FIG. 7. The system may be integrated with or may be a unitary part of a receiver or a control module that regulates entertainment and comfort.

The processes and features described in this application may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

Figure 8:
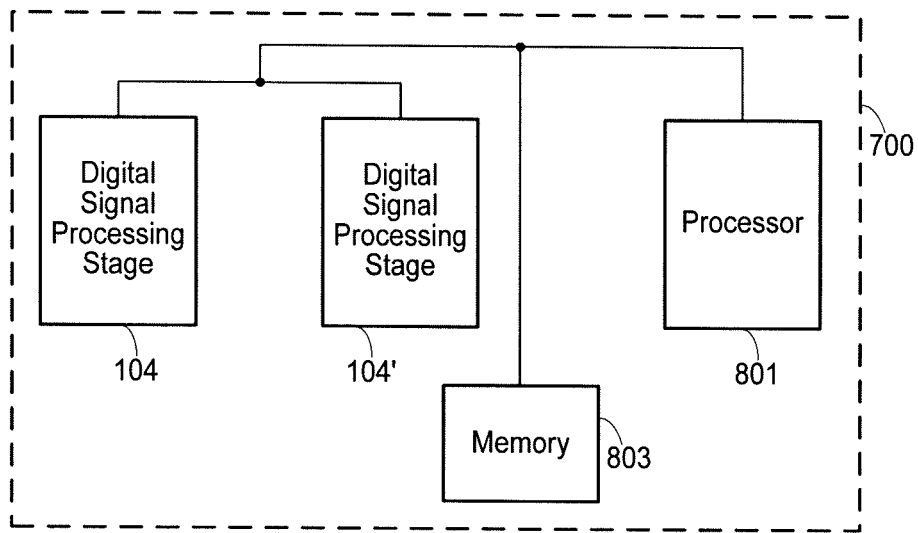
FIG. 8 is a diagram of a controller within a vehicle.

The computer system of vehicle 700 may comprise a processor 801, a memory 803, and digital signal processing stages 104 and 104' (e.g., FIG. 8). The memory 803 may include instructions for performing the steps of any of the methods, processes, calculations, or features described above. The processor 801 and the memory 803 may be incorporated into the digital signal processing stages 104 and 104' or may be separate. Any combination of hardware, software, or firmware may be used to represent the computer system.

The memory 803 may be a "computer-readable medium," "machine-readable medium," "propagated-signal" medium, and/or "signal-bearing medium" and may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM, some of which may be written to and read from in a vehicle.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

Figure 9:
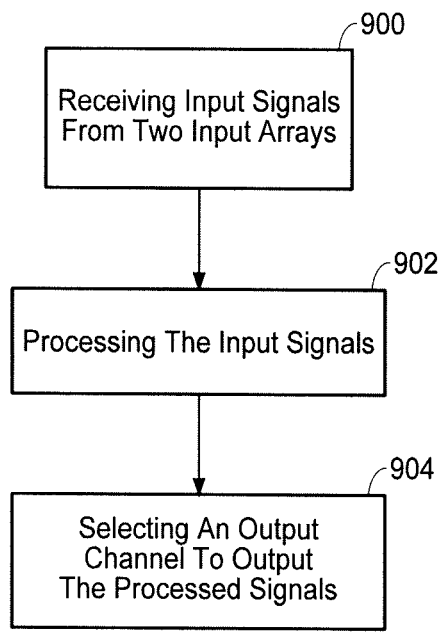
FIG. 9 is a method of enhancing communication in a noisy environment.

FIG. 9 is a method that enhances communication in a noisy environment. At act 900, a processing stage may receive input signals that are processed at 902. The input signals may be processed by an overdrive detector that compares the absolute value of each signal with a predetermined threshold. The input signals may be passed through a highpass filter. An output channel of two or more output channels may be selected to deliver the processed signals to a loudspeaker, at act 904. Selecting one or more output channels may determine an amplification for each selected output channel.

Figure 10:
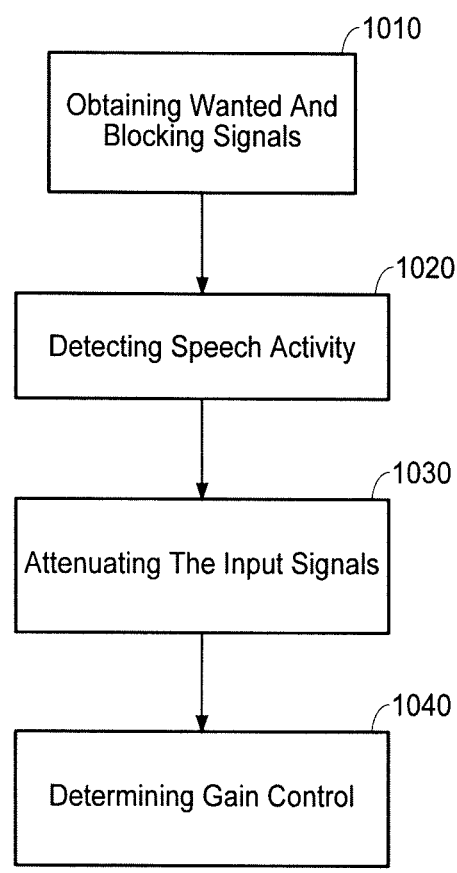
FIG. 10 is a method of processing an input in a noisy environment.

FIG. 10 is a method of processing the input signals. The input signal processing may include the methods, processes, calculations, or features described above. A processing stage may obtain wanted and blocking signals, at act 1010. In some systems, a wanted beamformer may transmit a wanted signal without attenuation while signal components in directions other than a preferred direction may be attenuated. A blocking beamformer may suppress signals from a wanted direction while transmitting signals from other directions of incidence with minimum distortion. At act 1020, speech activity may be detected. Speech activity may be detected based on the temporal and spatial information determined by the beamformers. Output signals of the wanted and blocking beamformers may be passed through band-pass filters. Attenuation may be applied to the signals, at act 1030. Attenuation factors may be based on a determined automatic gain control, active speaker determination, and/or output volume of each seat. Gain control may be determined, at act 1040. A speech level may be determined and compared to a reference value, and the speech level may be increased or decreased by a corresponding correction factor. The acts may occur in any order and may include additional acts.

In the enhancement systems, each beamformer corresponding to an input array may be adjusted independently of the other beamformers to adapt to ambient conditions. The temporal and spatial information may be used to detect noise sources from each input array and direct the zeros of the corresponding beamformer in the direction of these noise sources. In some systems, poles and zeros are used in the numerators and/or denominators of transfer functions to control performance. The determined information may be used to detect which one of the input arrays receive wanted speech signals to identify an active speaker. Because of the beamforming, an adaptation of the directivity may also be performed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method that enhances communication in a noisy environment comprising:
   receiving input signals from two input arrays, where each of the input arrays comprises two receivers;
   processing the input signals, including obtaining a wanted signal by a wanted signal beamformer and obtaining a blocking signal by a blocking beamformer; and
   selecting, based at least on the processed input signals, at least one loudspeaker out of at least two loudspeakers on which the processed input signals are to be output.

2. The method of claim 1, where the wanted signal beamformer comprises an adaptive beamformer.

3. The method of claim 1, where processing the input signals further comprises deciding whether a signal of the input signals is transmitted from a wanted signal direction.

4. The method of claim 3, where deciding comprises determining a wanted signal power and a blocking signal power, where the wanted signal beamformer is adapted if the blocking signal power is larger than a predetermined threshold.

5. The method of claim 1, where processing the input signals further comprises detecting speech activity.

6. The method of claim 5, where detecting speech activity comprises determining a wanted signal power, a blocking signal power, and a background noise signal power, and comparing the wanted signal power with the blocking signal power and the background noise signal power.

7. The method of claim 6, where detecting speech activity further comprises comparing the wanted signal powers of the input arrays and determining a highest power.

8. The method of claim 5, where processing the input signals further comprises attenuating the input signals if no speech activity is detected.

9. The method of claim 8, where attenuating the input signals comprises adaptively varying the attenuation in predetermined time steps between a nearly zero attenuation level and a maximum attenuation level.

10. The method of claim 1, where processing the input signals further comprises determining a gain control for the input signals.

11. The method of claim 10, where determining the gain control is performed adaptively.

12. The method of claim 1, where selecting the at least one loudspeaker comprises determining an amplification for each selected loudspeaker.

13. A computer-readable medium that stores instructions executable by a processor comprising:
  receiving input signals from two input arrays, where each of the input arrays comprises at least two devices that convert sound into an operational signal; and
  processing the input signals, including obtaining a wanted signal by a wanted signal beamformer and obtaining a blocking signal by a blocking beamformer; and
  selecting, based at least on the processed input signals, at least one loudspeaker out of at least two loudspeakers on which the processed input signals are to be output.

14. The computer-readable medium of claim 13 further comprising detecting speech activity.

15. A communication system comprising:
  a plurality of input arrays, where each of the input arrays comprises a plurality of receivers configured to convert sound into input signals;
  an analog-to-digital converter that converts the input signals into digital signals; and
  a digital signal processor stage that processes the digital signals into processed output signals provided to a plurality of loudspeakers,
  where the digital signal processing stage comprises a wanted signal beamformer and a blocking signal beamformer, and where the digital signal processing stage is configured to select, based at least on the processed digital signals, a loudspeaker from the plurality of loudspeakers that receives the processed output signals.

16. The communication system of claim 15, where the digital signal processor is programmed to detect speech.

17. The communication system of claim 16, where the digital signal processor is further configured to attenuate the digital signals if no speech is detected.

18. A communication system comprising:
  a plurality of input arrays, where each of the input arrays comprises means that convert sound into input signals;
  a converter means that converts the input signals into digital signals; and
  a processing means that processes the digital signals into processed output signals provided to a plurality of loudspeakers,
  where the processing means is configured to select, based at least on the processed digital signals, at least one loudspeaker from the plurality of loudspeakers that receives the processed output signals, and
  where each of the input arrays and each of the loudspeakers are associated with a seat in a vehicle.

* * * * *